(12) United States Patent
Bayley et al.

(10) Patent No.: US 6,752,418 B2
(45) Date of Patent: Jun. 22, 2004

(54) INFLATABLE CURTAIN

(75) Inventors: Gregory S. Bayley, Dryden, MI (US); Ayad G. Nayef, Sterling Heights, MI (US); Paul F. Altamore, Farmington Hills, MI (US); Douglas P. Campbell, Metamora, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 10/410,928

(22) Filed: Apr. 10, 2003

(65) Prior Publication Data

US 2003/0193175 A1 Oct. 16, 2003

Related U.S. Application Data

(62) Division of application No. 09/618,536, filed on Jul. 18, 2000.

(51) Int. Cl.[7] .......................... B60R 21/16; B60R 21/22
(52) U.S. Cl. ................................. 280/730.2; 280/743.1
(58) Field of Search ........................... 280/730.2, 730.1, 280/743.1

(56) References Cited

U.S. PATENT DOCUMENTS

| 5,094,475 | A | 3/1992 | Olsson et al. |
|---|---|---|---|
| 5,480,181 | A | 1/1996 | Bark et al. |
| 5,662,354 | A | 9/1997 | Ellerbrok |
| 5,775,726 | A | 7/1998 | Timothy et al. |
| 5,788,270 | A | 8/1998 | Haland et al. |
| 6,022,044 | A | 2/2000 | Cherry |
| 6,123,360 | A | 9/2000 | Amin et al. |
| 6,129,377 | A | 10/2000 | Okumura et al. |
| 6,260,878 | B1 | 7/2001 | Tanase |
| 6,264,234 | B1 | 7/2001 | Hill et al. |
| 6,318,753 | B1 | 11/2001 | Valkenburg |
| 6,367,836 | B1 | 4/2002 | Tanase et al. |

OTHER PUBLICATIONS

Bohman et al, "Reduction of Head Rotational Motions in Side Impacts Due to the Inflatable Curtain A way to Bring Down the Risk of Diffuse Brain Injury", Paper No. 98–S8–0–07, 16th ESV Conference, Jun. 1–4, 1998 Windsor Canada.

Dshpande et al "Development of MADYMO Modles of Passenger Vehicles for Simulating Side Impact Crashes" SAE Technical Paper Series 199–01–2885.

Ohlund et al "The Inflatable Curtain (iC)–A New Heas Protection System in Side Impacts", Paper No. 98–S8–W 29 (1998).

Ray et al. Evaluating Human Risk in Side Impact Collisions with Roadside Objects TRB 79th Annual Meeting Jan. 9–13, 2000, Washington DC Paper No. 00–0520.

*Primary Examiner*—Ruth Ilan
(74) *Attorney, Agent, or Firm*—Tarolli, Sundheim, Covell & Tummino L.L.P.

(57) ABSTRACT

A method includes the step providing an inflatable vehicle occupant protection device (14) between the side structure (16) of a vehicle (12) and a vehicle occupant (74). A thickness of the protection device (14) is determined by measuring between overlying points on overlying panels (40 and 42) of the protection device at location where an occupant's head having a given mass may contact the device. A pressure is determined as a predetermined function of the thickness of the protection device (14) and of a velocity at which the head may impact the protection device. The pressure has a magnitude sufficient to prevent a head having a given mass from striking the side structure (16) through the thickness of the protection device (14) when the head impacts the protection device at and below the velocity. An inflation fluid source (24) is provided to inflate the protection device (14) to at least the determined pressure.

31 Claims, 3 Drawing Sheets

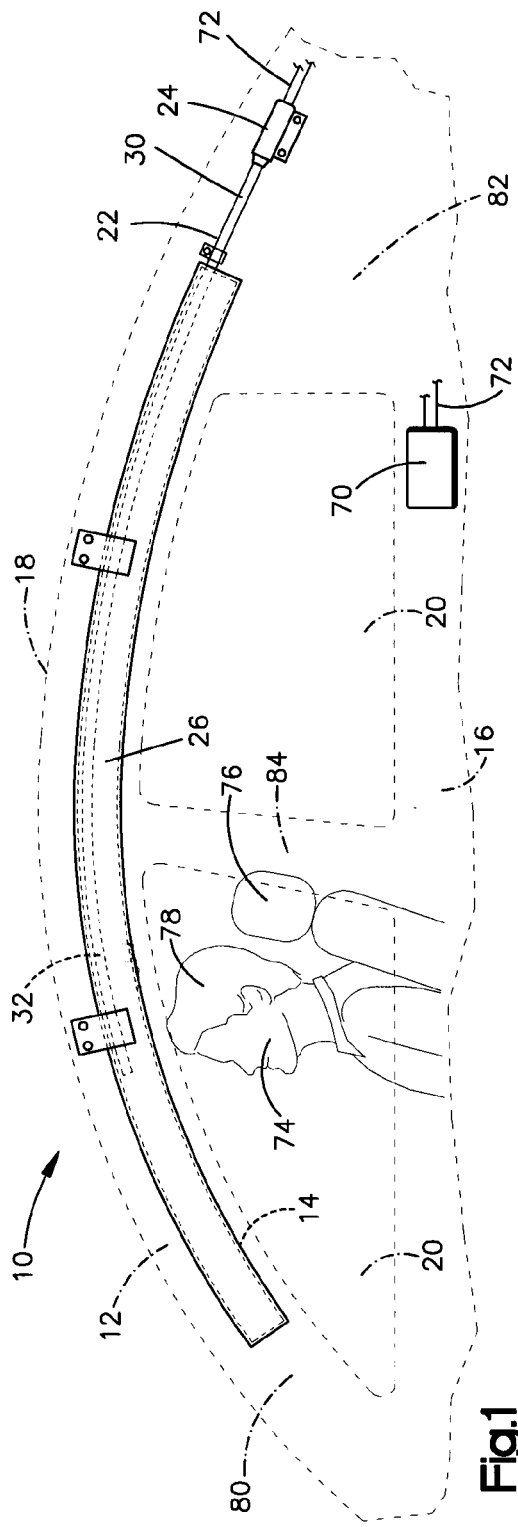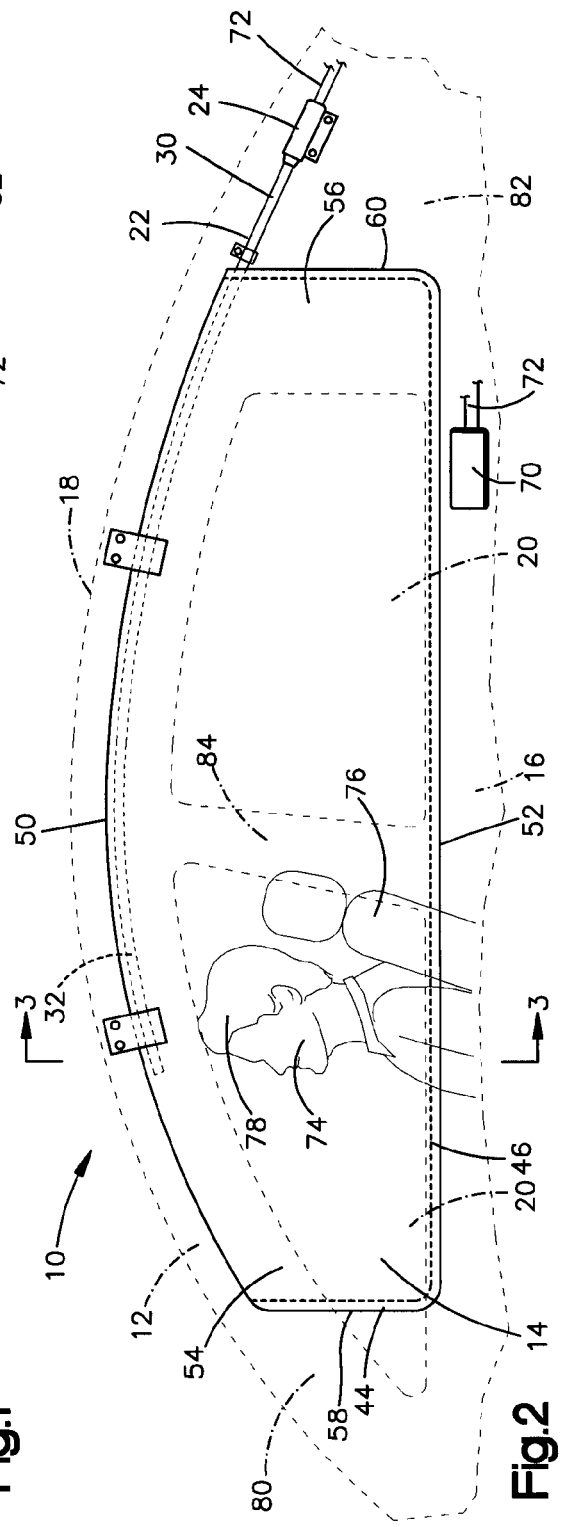

INFLATABLE CURTAIN

RELATED APPLICATION

This application is a division of U.S. patent application Ser. No. 09/618,536, filed on Jul. 18, 2000.

FIELD OF THE INVENTION

The present invention relates to an inflatable apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to a method for helping to protect an occupant of a vehicle that has a side structure and a roof. The method includes the step of providing an inflatable vehicle occupant protection device that is inflatable away from the vehicle roof into a position between the side structure of the vehicle and a vehicle occupant. The protection device includes overlying panels that are interconnected to define an inflatable volume of the protection device. A thickness of the protection device is determined when the protection device is inflated. The thickness is measured between overlying points on the overlying panels at a location where the head of an occupant may contact the protection device.

A pressure is determined as a predetermined function of the thickness of the protection device and of a velocity at which a head having a given mass may impact the protection device. The pressure has a magnitude sufficient to prevent the head from striking the side structure through the thickness of the protection device when the head impacts the protection device at and below the velocity. An inflation fluid source is provided. The inflation fluid source provides inflation fluid to the inflatable volume to inflate the protection device to at least the determined pressure.

The present invention also relates to a method for determining a pressure to which to inflate an inflatable vehicle occupant protection device inflatable between the side structure of a vehicle and a vehicle occupant. The method includes the step of determining a velocity at or below which it is desired to prevent a head having a given mass from striking the side structure through a thickness of the protection device. A plurality of sample inflated thicknesses are selected. The method also includes the step of determining for each of the sample inflated thicknesses a corresponding required inflation pressure. The required inflation pressure is just sufficient to prevent a head travelling at or below the determined velocity from striking the side structure through an inflatable vehicle occupant protection device having the sample inflated thickness. The method also includes the step of determining an equation that expresses pressure as a function of thickness. The equation is determined such that the equation when solved for each of the sample inflated thicknesses provides a corresponding one of the required inflation pressures. The equation is then used to determine the pressure to which to inflate the protection device as a function of the thickness.

The present invention also relates to a method for determining a pressure to which to inflate an inflatable vehicle occupant protection device inflatable between the side structure of a vehicle and a vehicle occupant. The method includes the step of determining a velocity at or below which it is desired to prevent a head having a given mass from striking the side structure through a thickness of the protection device. A plurality of sample inflated thicknesses are selected. The method also includes the step of determining for each of the sample inflated thicknesses a corresponding required inflation pressure. The required inflation pressure is just sufficient to prevent a head travelling at or below the determined velocity from striking the side structure through an inflatable vehicle occupant protection device having the sample inflated thickness. The method further includes the step of generating a plot that plots each of the sample inflated thicknesses versus its respective required inflation pressure. A curve is then fitted to the plot and the pressure to which to inflate the protection device is determined using the curve.

The present invention also relates to a method for helping to protect an occupant of a vehicle that has a side structure and a roof. The method includes the step of providing an inflatable vehicle occupant protection device that is inflatable away from the vehicle roof into a position between the side structure of the vehicle and a vehicle occupant. The protection device includes overlying panels that are interconnected to define an inflatable volume of the protection device. The method also includes the steps of determining a pressure to which to inflate the protection device and providing an inflation fluid source for providing inflation fluid to the inflatable volume to inflate the protection device to at least that pressure. The method further includes the step of determining the thickness of the protection device as a function of the pressure and of a velocity at which a head having a given mass may impact the protection device. The thickness is measured between overlying points on the overlying panels when the protection device is inflated at a location where a head may contact the protection device. The thickness is sufficient to prevent the head from striking the side structure through the protection device when the protection device is inflated to the pressure and the head impacts the protection device at or below the velocity.

The present invention further relates to a method for determining a thickness for an inflatable vehicle occupant protection device inflatable between the side structure of a vehicle and a vehicle occupant to a given pressure. The method includes the step of determining a velocity at or below which it is desired to prevent a head having a given mass from striking the side structure through the thickness of the protection device. A plurality of sample inflated thicknesses are selected. The method also includes the step of determining for each of the sample inflated thicknesses a corresponding required inflation pressure. The required inflation pressure is just sufficient to prevent a head travelling at or below the determined velocity from striking the side structure through an inflatable vehicle occupant protection device having the sample inflated thickness. The method further includes the step of determining an equation that expresses pressure as a function of thickness. The equation is determined such that the equation when solved for each of the sample inflated thicknesses provides a corresponding one of the required inflation pressures. The equation is then used to determine the thickness to which to inflate the protection device as a function of the given pressure.

The present invention also relates to a method for determining a thickness for an inflatable vehicle occupant protection device inflatable between the side structure of a vehicle and a vehicle occupant to a given pressure. The method includes the step of determining a velocity at or below which it is desired to prevent a head having a given mass from striking the side structure through the thickness of the protection device. A plurality of sample inflated thicknesses are selected. The method also includes the step of determining for each of the sample inflated thicknesses a corresponding required inflation pressure. The required inflation pressure is just sufficient to prevent a head travelling at or below the determined velocity from striking the side structure through an inflatable vehicle occupant protection device having the sample inflated thickness. The method further includes the step of generating a plot that plots each of the sample inflated thicknesses versus its respective required inflation pressure. A curve is fitted to the plot and the thickness for the protection device is determined using the curve.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable apparatus for helping to protect a vehicle occupant illustrating the apparatus in a deflated condition;

FIG. 2 is a schematic view of the apparatus of FIG. 1 in an inflated condition;

DESCRIPTION OF PREFERRED EMBODIMENTS

Figure 3:
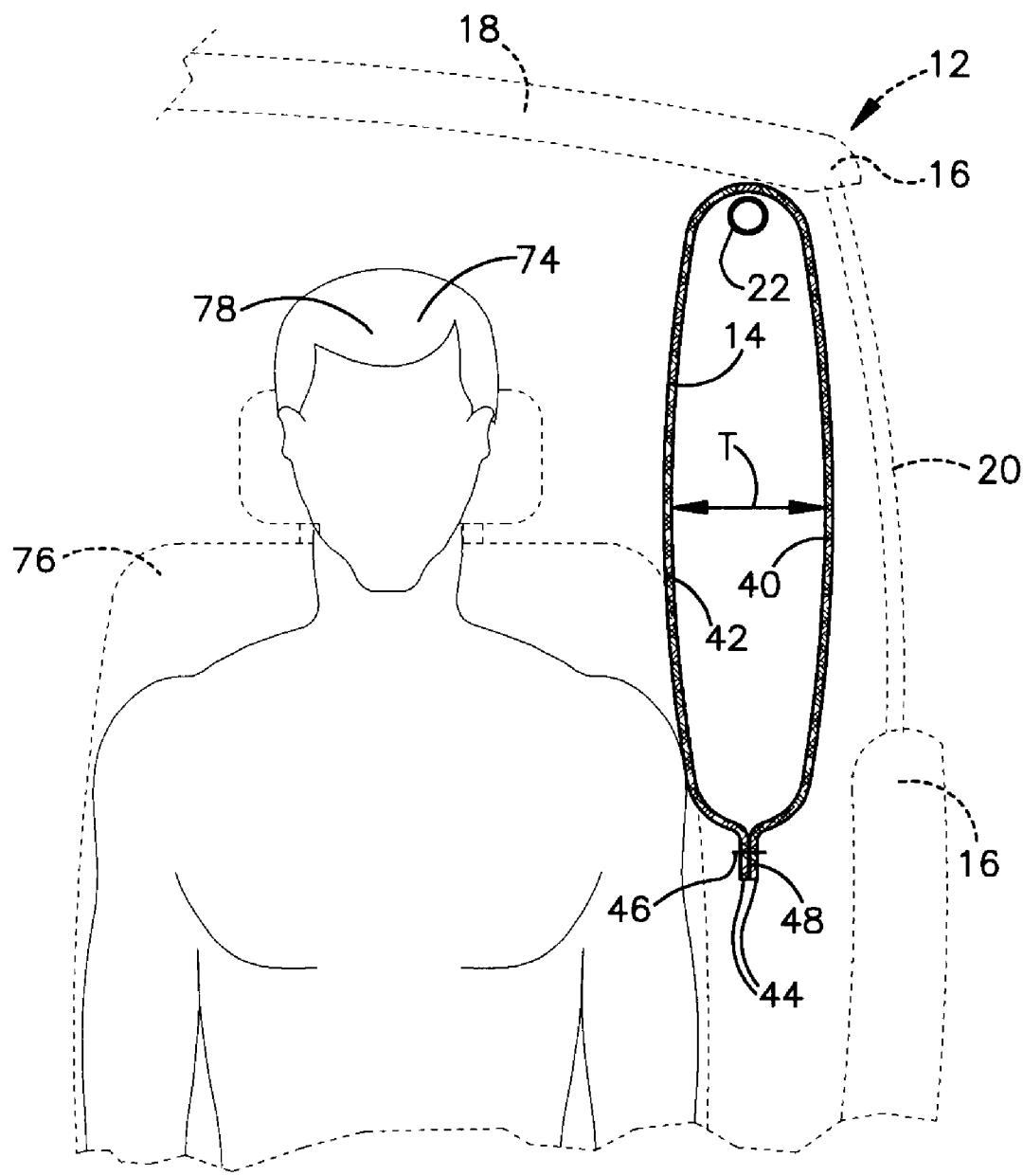
FIG. 3 is a view of the apparatus taken generally along line 3—3 in FIG. 2 with certain parts illustrated in section.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent to the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first portion 30 for receiving fluid from the inflator 24. The fill tube 22 has a second portion 32 disposed in the inflatable curtain 14. The second portion 32 of the fill tube 22 has a plurality of openings (not shown) that provide fluid communication between the fill tube 22 and the inflatable curtain 14. It will be recognized by those skilled in the art that the fill tube 22 may be omitted and the inflator 24 may be connected in direct fluid communication with the inflatable curtain 14. In such a configuration, the inflator 24 would be connected to an end of the inflatable curtain 14 or to a location on the curtain between the ends of the curtain.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 22 could be of any suitable type or construction for supplying a medium for inflating the inflatable curtain 14.

The apparatus 10 includes a housing 26 (FIG. 1) that stores the inflatable curtain 14 in a stored position prior to inflation of the curtain. The fill tube 22, the deflated inflatable curtain 14, and housing 26 have an elongated configuration and extend along the vehicle roof 18 and along the side structure 16 of the vehicle 12 above the side windows 20.

As best illustrated in FIG. 3, the inflatable curtain 14 comprises first and second panels 40 and 42 that are arranged in an overlying manner. Overlapping portions 44 of the first and second panels 40 and 42 are secured together by stitching 46 (FIGS. 2 and 3) that extends along a portion of the perimeter 48 of the inflatable curtain 14 to define an inflatable volume of the curtain. The inflatable curtain 14 may include connections (not shown) in which overlying portions of the first and second panels 40 and 42 are interconnected inside the perimeter 48 of the curtain. Such connections would help to define inflatable areas of the inflatable curtain 14 within the inflatable volume of the curtain.

In the illustrated embodiment, the inflatable curtain 14 (FIG. 3) is formed from a sheet of material that is folded over to form the overlying first and second panels 40 and 42. It will be recognized by those skilled in the art, however, that the inflatable curtain 14 could have alternative constructions. For example, the first and second panels 40 and 42 could be formed from separate sheets of material arranged in an overlying manner and secured together by stitching 46 that extends around the entire perimeter 48 of the panels to form the inflatable curtain 14. The first and second panels 40 and 42 may also be woven together to form the inflatable curtain 14.

The first and second panels 40 and 42 are constructed of a fabric, such as nylon, that is coated with a gas impermeable material such as urethane or silicone to form an inflatable volume. The inflatable curtain 14 thus has a substantially gas-tight construction. Other materials, such as elastomers, plastic films, or combinations thereof, may also be used to construct the inflatable curtain 14. The first and second panels 40 and 42 may also be formed of single or multi-layered sheets of material.

The perimeter 48 is defined at least partially by an upper edge 50 (FIG. 2) of the inflatable curtain 14, an opposite lower edge 52 of the curtain, and front and rear portions 54 and 56, respectively, of the curtain spaced apart horizontally along the upper and lower edges. In the embodiment illustrated in FIG. 2, the front and rear portions 54 and 56 of the inflatable curtain 14 are at least partially defined by front and rear edges 58 and 60, respectively, that are spaced horizontally apart along the upper and lower edges 50 and 52 and extend vertically between the upper and lower edges. The front and rear edges 58 and 60, however, could be omitted and the upper and lower edges 50 and 52 could be extended until they intersect, in which case the front and rear portions 54 and 56 would be defined by the intersecting upper and lower edges. Also, while the front and rear edges 58 and 60 are illustrated as being generally vertical, they could extend at some other angle between the upper and lower edges 50 and 52.

The vehicle 12 includes a sensor mechanism 70 (shown schematically in FIGS. 1 and 2) for sensing a side impact to the vehicle 12 and/or a rollover of the vehicle 12. The sensor mechanism 70 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 70 provides an electrical signal over lead wires 72 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 inflates away from the roof 18 in a downward direction as shown in the drawings and in a downward direction with respect to the direction of forward travel of the vehicle 12 into the position illustrated in FIGS. 2 and 3.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent the side structure 16 of the vehicle 12 and the second panel is positioned adjacent an occupant 74 of the vehicle and a vehicle seat 76. The upper edge 50 (FIG. 2) is positioned adjacent to the intersection of the roof 18 and the side structure 16 of the vehicle 12. The front edge 58 is positioned adjacent to an A pillar 80 of the vehicle 12. The rear edge 60 of the inflatable curtain 14 is positioned adjacent to a C pillar 82 of the vehicle 12. The inflatable curtain 14 extends between the A pillar 80 and the C pillar 82 of the vehicle 12 and overlies at least a portion of the A pillar, C pillar, and a B pillar 84 of the vehicle.

It will be recognized by those skilled in the art that the inflatable curtain 14 may have alternative configurations. For example, in the illustrated embodiment, the inflatable curtain 14 extends between the A pillar 80 and the C pillar 82 of the vehicle 12. The inflatable curtain 14 could, however, extend between the A pillar 80 and the B pillar 84 only or between the B pillar and the C pillar 82 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. When inflated, the inflatable curtain 14 helps to absorb the energy of impacts with the curtain and helps to distribute the impact energy over a large area of the curtain.

As illustrated in FIG. 3, when the inflatable curtain 14 is inflated, it has a thickness measured between the first and second panels 40 and 42, indicated generally by the line labeled T in FIG. 3. The thickness T is measured between overlying points on the first and second panels 40 and 42 in an inflatable area of the inflatable curtain 14 where an occupant's head 78 may contact the curtain in the event of a side impact or vehicle rollover. In the event of a side impact or vehicle rollover, the inflatable curtain 14 must be inflated to a pressure sufficient to prevent the occupant 74 from striking the vehicle side structure 16 through the curtain. Also, the inflatable curtain 14 must be inflated to a pressure sufficient to prevent the occupant 74 from striking an object (not shown) through the side window 20 of the vehicle 12. For a given inflatable curtain 14, the inflation pressure in the inflated curtain will vary depending on the desired thickness T of the inflated curtain.

In determining the inflation pressure in an inflated curtain 14 having a desired thickness T when inflated, experimentation is typically performed in order to evaluate the performance of the curtain at various pressures. In performing such experimentation, it may be desirable to simulate the performance of an inflatable curtain 14. This can be accomplished by creating a computer-generated model that allows the performance of the inflatable curtain 14 to be monitored under simulated conditions. The use of a computer-generated model allows an inflatable curtain 14 to be evaluated repeatedly in order to identify curtain thickness/inflation pressure combinations that will produce the desired curtain performance. According to a first embodiment of the present invention, a computer generated model was used to simulate an occupant's head having a mass of 6.08 kilograms impacting the inflated curtain 14 at a velocity of 18 miles per hour.

It was determined that the required inflation pressure of the inflatable curtain 14 is independent of the volume of the curtain, the curtain volume being between 20–45 liters. While maintaining the inflatable curtain 14 at a volume between 20–45 liters, the curtain was modified to have various desired thicknesses. The computer generated model determined the required inflation pressure to prevent the simulated occupant head from striking or impacting the vehicle side structure 16 through the curtain for each desired thickness. A list of calculated curtain thickness/inflation pressure combinations generated by the model are illustrated in the following table:

| Curtain Thickness (mm) | Required Pressure (kPa) |
|---|---|
| 55 | 400 |
| 93 | 136 |
| 107 | 99 |
| 110 | 81 |
| 117 | 65 |
| 123 | 59 |
| 145 | 34 |
| 200 | 8.5 |

Figure 4:
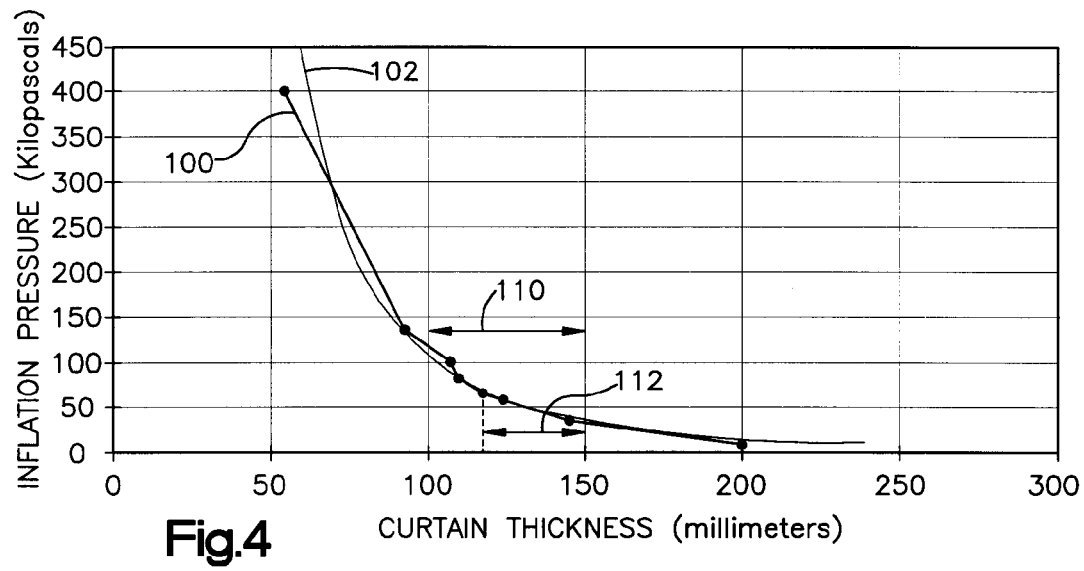
FIG. 4 is a graph illustrating certain characteristics of the apparatus of FIG. 1, according to a first embodiment of the invention.

The above-listed curtain thickness and inflation pressure combinations are plotted on a graph illustrated in FIG. 4. A first curve 100 is fitted to the experimenal curtain thickness/inflation pressure combinations illustrated in FIG. 4. A first formula for calculating inflation pressure approximates the first curve 100. The first formula was determined using known mathematical operations, and is listed below:

$$P=(4.2\times10^7)T^{-2.8};$$

wherein P represents the required inflation pressure expressed in terms of kilopascals and T represents the thickness of the inflatable curtain 14 expressed in millimeters. The first formula is represented by a second curve 102 plotted in FIG. 4.

It will be recognized by those skilled in the art that physical limitations of the vehicle 12 (FIGS. 1–3) will affect the construction of the apparatus 10. For example, the thickness of the inflatable curtain 14 may be limited by the amount of space between the side structure 16 of the vehicle 12 and the vehicle occupant 74 or the vehicle seat 76. Also, it may be impractical to provide an inflator 24 capable of delivering inflation fluid at extremely high pressures. Thus, as viewed in FIG. 4, the end regions of the first and second curves 100 and 102, i.e., where the inflation pressure is high and where the curtain is extremely thick, may be eliminated as an acceptable curtain thickness/inflation pressure combination.

By eliminating the end regions of the curves in FIG. 4, an inflatable curtain 14 having a thickness of between 100–150 millimeters, which corresponds to an inflated pressure of between 30–110 kilopascals, was determined to be within an acceptable range for the construction of the apparatus 10. This acceptable range is indicated by the line labeled 110 in FIG. 4. Also, it was determined that an inflatable curtain 14 having a thickness of between 120–150 millimeters, which corresponds to an inflated pressure of between 30–65 kilopascals, is a preferred range for the construction of the apparatus 10. This preferred range is indicated by the line labeled 112 in FIG. 4.

As illustrated in FIG. 4, the first formula, represented by the second curve 102, approximates the data calculated by the computer generated model in the 18 mile per hour scenario. Thus, when designing an inflatable curtain having a volume of between 20–45 liters and a known thickness, the required inflation pressure can be determined using the first formula. Conversely, where an inflator will inflate an inflatable curtain having a volume between 20–45 liters to a known pressure, the required curtain thickness can also be calculated using the first formula.

According to a second embodiment of the present invention, a computer generated model was used to simulate an occupant's head having a mass of 6.08 kilograms impacting the inflated curtain 14 at a velocity of 12 miles per hour. While maintaining the inflatable curtain 14 at a volume between 20–45 liters, the curtain was modified to have various desired thicknesses. The computer generated model determined the required inflation pressure to prevent the simulated occupant head from striking or impacting the vehicle side structure 16 through the curtain for each desired thickness. A list of calculated curtain thickness/inflation pressure combinations generated by the model are illustrated in the following table:

| Curtain Thickness (mm) | Required Pressure (kPa) |
| --- | --- |
| 38 | 220 |
| 55 | 120 |
| 85 | 69 |
| 98 | 42 |
| 107 | 36 |
| 110 | 27 |
| 120 | 20 |
| 149 | 13 |
| 200 | 1 |

Figure 5:
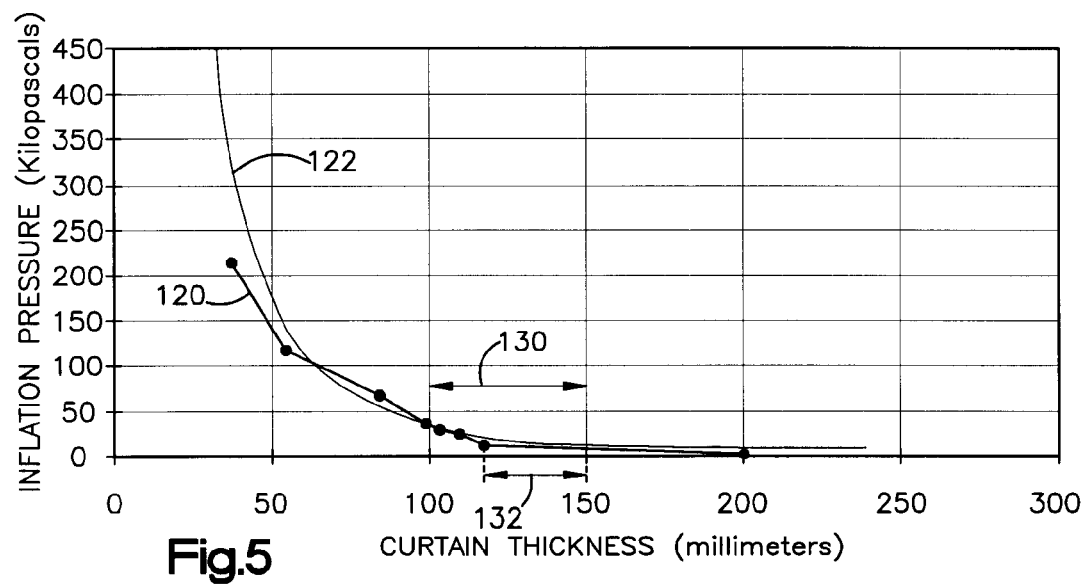
FIG. 5 is a graph illustrating certain characteristics of the apparatus of FIG. 1, according to a second embodiment of the invention.

The above-listed curtain thickness and inflation pressure combinations are plotted on a graph illustrated in FIG. 5. A third curve 120 is fitted to the experimental curtain thickness/inflation pressure combinations illustrated in FIG. 5. A second formula for calculating inflation pressure approximates the third curve 120. The second formula was determined using known mathematical operations, and is listed below:

$$P = (3.0 \times 10^5) T^{-1.92};$$

wherein P represents the required inflation pressure expressed in terms of kilopascals and T represents the thickness of the inflatable curtain 14 expressed in millimeters. The second formula is represented by a fourth curve 122 plotted in FIG. 5.

As viewed in FIG. 5, the end regions of the third and fourth curves 120 and 122, i.e., where the inflation pressure is high and where the curtain is extremely thick, may be eliminated as an acceptable curtain thickness/inflation pressure combination. By eliminating the end regions of the curves in FIG. 5, an inflatable curtain 14 having a thickness of between 100–150 millimeters, which corresponds to an inflated pressure of between 13–43 kilopascals, was determined to be within an acceptable range for the construction of the apparatus 10. This acceptable range is indicated by the line labeled 130 in FIG. 5. Also, it was determined that an inflatable curtain 14 having a thickness of between 120–150 millimeters, which corresponds to an inflated pressure of between 13–20 kilopascals, is a preferred range for the construction of the apparatus 10. This preferred range is indicated by the line labeled 132 in FIG. 5.

As illustrated in FIG. 5, the second formula, represented by the fourth curve 122, approximates the data calculated by the computer generated model in the 12 mile per hour scenario. Thus, when designing an inflatable curtain having a volume of between 20–45 liters and a known thickness, the required inflation pressure can be determined using the second formula. Conversely, where an inflator will inflate an inflatable curtain having a volume between 20–45 liters to a known pressure, the required curtain thickness can also be calculated using the second formula.

From the above description of the invention, those skilled in the art will perceive improvements, changes and modifications. Such improvements, changes and modifications within the skill of the art are intended to be covered by the appended claims.

Having described the invention, the following is claimed:

1. A method for helping to protect an occupant of a vehicle that has a side structure and a roof, said method comprising the steps of:

providing an inflatable vehicle occupant protection device that is inflatable away from the vehicle roof into a position between the side structure of the vehicle and a vehicle occupant, said inflatable vehicle occupant protection device comprising overlying panels that are interconnected to define an inflatable volume of said inflatable vehicle occupant protection device;

determining a thickness of said inflatable vehicle occupant protection device when inflated, said thickness being measured between overlying points on said overlying panels at a location where a head of an occupant may contact said inflatable vehicle occupant protection device;

determining a pressure using a predetermined mathematical equation that expresses said pressure in terms of said thickness of said inflatable vehicle occupant protection device, said pressure having a magnitude sufficient to prevent a head having a given mass from striking the side structure through said thickness of said inflatable vehicle occupant protection device when the head impacts said inflatable vehicle occupant protection device at and below a given velocity; and providing an inflation fluid source for providing inflation fluid to said inflatable volume to inflate said inflatable vehicle occupant protection device to at least said pressure.

2. A method for helping to protect an occupant of a vehicle that has a side structure and a roof, said method comprising the steps of:

providing an inflatable vehicle occupant protection device that is inflatable away from the vehicle roof into a position between the side structure of the vehicle and a vehicle occupant, said inflatable vehicle occupant protection device comprising overlying panels that are interconnected to define an inflatable volume of said inflatable vehicle occupant protection device;

determining a thickness of said inflatable vehicle occupant protection device when inflated, said thickness being measured between overlying points on said overlying panels at a location where the head of an occupant may contact said inflatable vehicle occupant protection device;

determining a pressure as a predetermined function of said thickness of said inflatable vehicle occupant protection device and of a velocity at which a head having a given mass may impact said inflatable vehicle occupant protection device, said pressure having a magnitude sufficient to prevent the head from striking the side structure through said thickness of said inflatable vehicle occupant protection device when the head impacts said inflatable vehicle occupant protection device at and below said velocity; and providing an inflation fluid source for providing inflation fluid to said inflatable volume to inflate said inflatable vehicle occupant protection device to at least said pressure, wherein said step of determining a pressure as a predetermined function comprises the steps of:

determining a velocity at and below which the head is to be prevented from striking the side structure through said thickness of said inflatable vehicle occupant protection device;

selecting a plurality of sample inflated thicknesses of said inflatable vehicle occupant protection device;

determining for each of said sample inflated thicknesses a required inflation pressure just sufficient to prevent the head travelling at said determined velocity from striking the side structure through each of said sample inflated thicknesses;

determining an equation using said sample inflated thicknesses and the corresponding determined required inflation pressures, said equation expressing required inflation pressure as a function of thickness; and using said equation as said predetermined function for determining said pressure.

3. The method recited in claim 2, wherein said equation is determined such that said equation when solved with each of said sample inflated thicknesses provides a corresponding one of said required inflation pressures.

4. The method recited in claim 2, wherein said step of determining an equation comprises the steps of:

generating a plot that plots each of said sample inflated thicknesses versus its respective required inflation pressure;

fitting a curve to said plot; and determining said equation representative of said curve.

5. The method recited in claim 2, wherein said step of determining for each of said sample inflated thicknesses a required inflation pressure comprises the step of determining a pressure sufficient to prevent a head having a mass of 6.08 kilograms travelling at a velocity of eighteen miles per hour from striking the side structure through each of said sample inflated thicknesses of said inflatable vehicle occupant protection device.

6. The method recited in claim 2, wherein said step of determining for each of said sample inflated thicknesses a required inflation pressure comprises the step of determining a pressure sufficient to prevent a head having a mass of 6.08 kilograms travelling at a velocity of twelve miles per hour from striking the side structure through each of said sample inflated thicknesses of said inflatable vehicle occupant protection device.

7. A method for helping to protect an occupant of a vehicle that has a side structure and a roof, said method comprising the steps of:

providing an inflatable vehicle occupant protection device that is inflatable away from the vehicle roof into a position between the side structure of the vehicle and a vehicle occupant, said inflatable vehicle occupant protection device comprising overlying panels that are interconnected to define an inflatable volume of said inflatable vehicle occupant protection device;

determining a thickness of said inflatable vehicle occupant protection device when inflated, said thickness being measured between overlying points on said overlying panels at a location where the head of an occupant may contact said inflatable vehicle occupant protection device;

determining a pressure as a predetermined function of said thickness of said inflatable vehicle occupant protection device and of a velocity at which a head having a given mass may impact said inflatable vehicle occupant protection device, said pressure having a magnitude sufficient to prevent the head from striking the side structure through said thickness of said inflatable vehicle occupant protection device when the head impacts said inflatable vehicle occupant protection device at and below said velocity; and providing an inflation fluid source for providing inflation fluid to said inflatable volume to inflate said inflatable vehicle occupant protection device to at least said pressure, wherein said step of determining a pressure as a predetermined function comprises the steps of:

determining a velocity at or below which the head is to be prevented from striking the side structure through said thickness of said inflatable vehicle occupant protection device;

selecting a plurality of sample inflated thicknesses of said inflatable vehicle occupant protection device;

determining for each of said sample inflated thicknesses a required inflation pressure just sufficient to prevent the head travelling at said determined velocity from striking the side structure through each of said sample inflated thicknesses;

generating a plot that plots each of said sample inflated thicknesses versus its corresponding required inflation pressure;

fitting a curve to said plot; and determining said pressure using said curve.

8. The method recited in claim 7, wherein said step of determining said pressure comprises the steps of:

identifying a location on said curve that corresponds to said thickness of said inflatable vehicle occupant protection device; and identifying a corresponding pressure at said location on said curve.

9. The method recited in claim 1, wherein said step of determining a pressure as a predetermined function comprises the step of determining said pressure according to the predetermined function:

$P = (4.2 \times 10^7) T^{-2.8}$;

wherein P represents said pressure expressed in kilopascals and T represents said thickness expressed in millimeters.

10. The method recited in claim 1, wherein said step of determining a pressure as a predetermined function comprises the step of determining said pressure according to the predetermined function:

$$P=(3.0\times10^5)T^{-1.92};$$

wherein P represents said pressure expressed in kilopascals and T represents said thickness expressed in millimeters.

11. The method recited in claim 1, wherein said step of determining a thickness comprises the step of selecting a thickness of 120–150 millimeters.

12. The method recited in claim 1, wherein said step of providing an inflatable vehicle occupant protection device comprises the step of selecting an inflatable vehicle occupant protection device in which said inflatable volume is 20–45 liters.

13. The method recited in claim 1, wherein said step of providing an inflatable vehicle occupant protection device comprises the step of interconnecting said overlying panels to help define inflatable areas of said inflatable curtain, said step of determining a thickness comprising measuring a distance between said overlying panels within said inflatable areas.

14. A method for determining a pressure to which to inflate an inflatable vehicle occupant protection device inflatable between the side structure of a vehicle and a vehicle occupant, said method comprising the steps of:

determining a velocity at or below which it is desired to prevent a head having a given mass from striking the side structure through a thickness of the inflatable vehicle occupant protection device;

selecting a plurality of sample inflated thicknesses;

determining for each of said sample inflated thicknesses a corresponding required inflation pressure, said required inflation pressure being just sufficient to prevent a head travelling at or below said determined velocity from striking the side structure through an inflatable vehicle occupant protection device having said sample inflated thickness;

determining an equation that expresses pressure as a function of thickness, said equation being determined such that said equation when solved for each of said sample inflated thicknesses provides a corresponding one of said required inflation pressures; and using said equation to determine the pressure to which to inflate the inflatable vehicle occupant protection device as a function of said thickness.

15. The method recited in claim 14, wherein said step of determining an equation comprises the steps of:

generating a plot that plots each of said sample inflated thicknesses versus its corresponding required inflation pressure;

fitting a curve to said plot;

determining said equation as being representative of said curve.

16. A method for determining a pressure to which to inflate an inflatable vehicle occupant protection device inflatable between the side structure of a vehicle and a vehicle occupant, said method comprising the steps of:

determining a velocity at or below which it is desired to prevent a head having a given mass from striking the side structure through a thickness of the inflatable vehicle occupant protection device;

selecting a plurality of sample inflated thicknesses;

determining for each of said sample inflated thicknesses a corresponding inflation pressure, said required inflation pressure being just sufficient to prevent a head travelling at or below said determined velocity from striking the side structure through an inflatable vehicle occupant protection device having said sample inflated thickness;

generating a plot that plots each of said sample inflated thicknesses versus its respective required inflation pressure;

fitting a curve to said plot; and determining the pressure to which to inflate said inflatable vehicle occupant protection device using said curve.

17. The method recited in claim 16, wherein said step of determining the pressure to which to inflate said inflatable vehicle occupant protection device comprises the steps of:

identifying a location on said curve that corresponds to said thickness of said inflatable vehicle occupant protection device; and identifying a corresponding pressure at said location on said curve.

18. A method for helping to protect an occupant of a vehicle that has a side structure and a roof, said method comprising the steps of:

providing an inflatable vehicle occupant protection device that is inflatable away from the vehicle roof into a position between the side structure of the vehicle and a vehicle occupant, said inflatable vehicle occupant protection device comprising overlying panels that are interconnected to define an inflatable volume of said inflatable vehicle occupant protection device;

determining a pressure to which to inflate said inflatable vehicle occupant protection device;

providing an inflation fluid source for providing inflation fluid to said inflatable volume to inflate said inflatable vehicle occupant protection device to at least said pressure; and determining a thickness for said inflatable vehicle occupant protection device using a predetermined mathematical equation that expresses said thickness in terms of said pressure, said thickness being measured between overlying points on said overlying panels when said inflatable vehicle occupant protection device is inflated at a location where a head may contact said inflatable vehicle occupant protection device, said thickness being sufficient to prevent a head having a given mass from striking the side structure through said inflatable vehicle occupant protection device when said inflatable vehicle occupant protection device is inflated to said pressure and the head impacts said inflatable vehicle occupant protection device at or below a given velocity.

19. A method for helping to protect an occupant of a vehicle that has a side structure and a roof, said method comprising the steps of:

providing an inflatable vehicle occupant protection device that is inflatable away from the vehicle roof into a position between the side structure of the vehicle and a vehicle occupant, said inflatable vehicle occupant protection device comprising overlying panels that are interconnected to define an inflatable volume of said inflatable vehicle occupant protection device;

determining a pressure to which to inflate said inflatable vehicle occupant protection device;

providing an inflation fluid source for providing inflation fluid to said inflatable volume to inflate said inflatable vehicle occupant protection device to at least said pressure; and determining a thickness for said inflatable vehicle occupant protection device as a function of said pressure and of a velocity at which a head having a given mass may impact said inflatable vehicle occupant protection device, said thickness being measured between overlying points on said overlying panels when said inflatable vehicle occupant protection device is inflated at a location where a head may contact said inflatable vehicle occupant protection device, said thickness being sufficient to prevent the head from striking the side structure through said inflatable vehicle occupant protection device when said inflatable vehicle occupant protection device is inflated to said pressure and the head impacts said inflatable vehicle occupant protection device at or below said velocity, wherein said step of determining a thickness comprises the steps of:

determining a velocity at or below which the head is to be prevented from striking the side structure through said thickness of said inflatable vehicle occupant protection device;

selecting a plurality of sample inflated thicknesses of said inflatable vehicle occupant protection device;

determining for each of said sample inflated thicknesses a required inflation pressure just sufficient to prevent the head travelling at said determined velocity from striking the side structure through each of said sample inflated thicknesses;

determining an equation using said sample inflated thickness and the corresponding determined required inflation pressures, said equation expressing said thickness as a function of said required inflation pressures; and using said equation as said predetermined function for determining said thickness.

20. The method recited in claim 19, wherein said equation is determined such that said equation when solved with each of said sample inflated thicknesses provides a corresponding one of said required inflation pressures.

21. The method recited in claim 19, wherein said step of determining an equation comprises the steps of:

generating a plot that plots each of said sample inflated thicknesses versus its respective required inflation pressure;

fitting a curve to said plot; and determining said equation representative of said curve.

22. The method recited in claim 19, wherein said step of determining for each of said sample inflated thicknesses a required inflation pressure comprises the step of determining a pressure sufficient to prevent a head having a mass of 6.08 kilograms travelling at a velocity of eighteen miles per hour from striking the side structure through each of said sample inflated thicknesses of said inflatable vehicle occupant protection device.

23. The method recited in claim 19, wherein said step of determining for each of said sample inflated thicknesses a required inflation pressure comprises the step of determining a pressure sufficient to prevent a head having a mass of 6.08 kilograms travelling at a velocity of twelve miles per hour from striking the side structure through each of said sample inflated thicknesses of said inflatable vehicle occupant protection device.

24. A method for helping to protect an occupant of a vehicle that has a side structure and a roof, said method comprising the steps of:

providing an inflatable vehicle occupant protection device that is inflatable away from the vehicle roof into a position between the side structure of the vehicle and a vehicle occupant, said inflatable vehicle occupant protection device comprising overlying panels that are interconnected to define an inflatable volume of said inflatable vehicle occupant protection device;

determining a pressure to which to inflate said inflatable vehicle occupant protection device;

providing an inflation fluid source for providing inflation fluid to said inflatable volume to inflate said inflatable vehicle occupant protection device to at least said pressure; and determining a thickness for said inflatable vehicle occupant protection device as a function of said pressure and of a velocity at which a head having a given mass may impact said inflatable vehicle occupant protection device, said thickness being measured between overlying points on said overlying panels when said inflatable vehicle occupant protection device is inflated at a location where a head may contact said inflatable vehicle occupant protection device, said thickness being sufficient to prevent the head from striking the side structure through said inflatable vehicle occupant protection device when said inflatable vehicle occupant protection device is inflated to said pressure and the head impacts said inflatable vehicle occupant protection device at or below said velocity, wherein said step of determining said thickness as a predetermined function comprises the steps of:

determining a velocity at or below which the head is to be prevented from striking the side structure through said thickness of said inflatable vehicle occupant protection device;

selecting a plurality of sample inflated thicknesses of said inflatable vehicle occupant protection device;

determining for each of said sample inflated thicknesses a required inflation pressure just sufficient to prevent the head travelling at said determined velocity from striking the side structure through each of said sample inflated thicknesses;

generating a plot that plots each of said sample inflated thicknesses versus its respective required inflation pressure;

fitting a curve to said plot; and determining said thickness using said curve.

25. The method recited in claim 24, wherein said step of determining said thickness comprises the steps of:

identifying a location on said curve that corresponds to said pressure of said inflatable vehicle occupant protection device; and identifying a corresponding thickness at said location on said curve.

26. The method recited in claim 18, wherein said step of determining a thickness as a predetermined function comprises the step of determining said thickness according to the predetermined function:

$$P=(4.2\times 10^7)T^{-2.8};$$

wherein P represents said pressure expressed in kilopascals and T represents said thickness expressed in millimeters.

27. The method recited in claim 18, wherein said step of determining a thickness as a predetermined function comprises the step of determining said thickness according to the predetermined function:

$$P=(3.0\times10^5)T^{-1.92};$$

wherein P represents said pressure expressed in kilopascals and T represents said thickness expressed in millimeters.

28. A method for determining a thickness for an inflatable vehicle occupant protection device inflatable between the side structure of a vehicle and a vehicle occupant to a given pressure, said method comprising the steps of:

determining a velocity at or below which it is desired to prevent a head having a given mass from striking the side structure through the thickness of the inflatable vehicle occupant protection device;

selecting a plurality of sample inflated thicknesses;

determining for each of said sample inflated thicknesses a corresponding required inflation pressure, said required inflation pressure being just sufficient to prevent a head travelling at or below said determined velocity from striking the side structure through an inflatable vehicle occupant protection device having said sample inflated thickness;

determining an equation that expresses pressure as a function of thickness, said equation being determined such that said equation when solved for each of said sample inflated thicknesses provides a corresponding one of said required inflation pressures; and using said equation to determine the thickness to which to inflate the inflatable vehicle occupant protection device as a function of the given pressure.

29. The method recited in claim 28, wherein said step of determining an equation comprises the steps of:

generating a plot that plots each of said sample inflated thicknesses versus its corresponding required inflation pressure;

fitting a curve to said plot;

determining said equation as being representative of said curve.

30. A method for determining a thickness for an inflatable vehicle occupant protection device inflatable between the side structure of a vehicle and a vehicle occupant to a given pressure, said method comprising the steps of:

determining a velocity at or below which it is desired to prevent a head having a given mass from striking the side structure through the thickness of the inflatable vehicle occupant protection device;

selecting a plurality of sample inflated thicknesses;

determining for each of said sample inflated thicknesses a corresponding required inflation pressure, said required inflation pressure being just sufficient to prevent a head travelling at or below said determined velocity from striking the side structure through an inflatable vehicle occupant protection device having said sample inflated thickness;

generating a plot that plots each of said sample inflated thicknesses versus its respective required inflation pressure;

fitting a curve to said plot; and determining said thickness for said inflatable vehicle occupant protection device using said curve.

31. The method recited in claim 30, wherein said step of determining said thickness comprises the steps of:

identifying a location on said curve that corresponds to the given pressure of said inflatable vehicle occupant protection device; and identifying a corresponding thickness at said location on said curve.

* * * * *